US009820502B2

(12) United States Patent
Cañada Millán et al.

(10) Patent No.: US 9,820,502 B2
(45) Date of Patent: Nov. 21, 2017

(54) SURIMI FOOD PRODUCT AND METHOD OF MANUFACTURING THE SAME

(71) Applicant: ANGULAS AGUINAGA, S.A.U., Irura (ES)

(72) Inventors: Javier Cañada Millán, Irura (ES); Maria Barandiaran Martinez, Irura (ES); Ana Aseguinolaza Garcia, Irura (ES); Beatriz Uriarte Seminario, Irura (ES)

(73) Assignee: ANGULAS AGUINAGA, S.A.U., Guipuzcoa (ES)

( * ) Notice: Subject to any disclaimer, the term of this patent is extended or adjusted under 35 U.S.C. 154(b) by 0 days.

(21) Appl. No.: 14/579,115

(22) Filed: Dec. 22, 2014

(65) Prior Publication Data

US 2016/0037819 A1 Feb. 11, 2016

Related U.S. Application Data

(63) Continuation of application No. PCT/ES2014/070643, filed on Aug. 6, 2014.

(51) Int. Cl.
*A23L 17/00* (2016.01)
*A23L 1/325* (2006.01)

(52) U.S. Cl.
CPC ............ *A23L 1/3255* (2013.01); *A23L 17/70* (2016.08); *A23V 2002/00* (2013.01)

(58) Field of Classification Search
CPC ........... A23L 1/3255; A23L 2/56; A23L 1/16; A23L 1/1613; A23L 17/70; A23J 3/26; A23J 3/04; A21D 2/261
USPC ................................ 426/643, 656, 513, 650
See application file for complete search history.

(56) References Cited

U.S. PATENT DOCUMENTS

| | | | |
|---|---|---|---|
| 2007/0172575 | A1 | 7/2007 | Gune |
| 2009/0068336 | A1 | 3/2009 | Torney et al. |

FOREIGN PATENT DOCUMENTS

| | | | | |
|---|---|---|---|---|
| ES | 2010637 | A6 | | 11/1989 |
| ES | 2017443 | A6 | * | 2/1991 |
| ES | 2019193 | | | 6/1991 |
| ES | 2034921 | A6 | | 4/1993 |
| WO | WO 2009079936 | A1 | * | 7/2009 |
| WO | 2012057826 | A1 | | 5/2012 |
| WO | 2015011634 | A1 | | 1/2015 |

* cited by examiner

*Primary Examiner* — Vera Stulii
(74) *Attorney, Agent, or Firm* — Cantor Colburn LLP

(57) ABSTRACT

The present invention relates to a surimi food product similar to fresh pasta, which is furthermore ready for immediate consumption. It also relates to the method of manufacturing said food product.

17 Claims, No Drawings

SURIMI FOOD PRODUCT AND METHOD OF MANUFACTURING THE SAME

CROSS-REFERENCE TO RELATED APPLICATIONS

This application is a continuation of international Application No, PCT/ES2014/070643, filed Aug. 6, 2014, the contents of which are hereby incorporated by reference in its entirety.

FIELD OF THE INVENTION

The present invention belongs to the food sector and more specifically relates to a surimi-based food product similar to fresh pasta. The present invention also relates to the method of manufacturing said food product.

BACKGROUND OF THE INVENTION

The manufacture of products similar to natural fish or shellfish from a product called surimi has been known for many years. The term surimi refers to a product obtained from fish muscle that is chopped, washed and drained to a proportion of water similar to the original, with added protein cryoprotectants and generally preserved in a frozen state. All these products similar to natural fish or shellfish, such as crab legs, shrimp, scallops, lobster, etc., are developed by forming gels with a different texture, form and flavor, depending on the physicochemical variations introduced in the myofibrillar protein of fish, which is the basis of surimi. These gel modifications are obtained by applying different heat treatments, kneading time, conditions of the atmosphere in which it is processed, etc., and/or by adding specific ingredients or additives physically or chemically changing the protein network texture or giving it a characteristic aroma.

In this sense and as an example of the various background documents existing in the field of surimi-based substitutes. Spanish invention patent ES 2010637 belonging to the applicant of the present application can be mentioned, in which the object is a process of manufacturing a product similar to elver using surimi mixed with other ingredients. This patent describes a process defined by a first phase of mixing and chopping at a temperature that must not be greater than 15° C., and a second phase of homogenizing between 0° C. and 15° C., for forming the product thereafter by molding or extrusion. Likewise, another Spanish patent belonging to the applicant of the present application describes a food product similar to txangurro (baked crab) and the process of manufacture thereof (ES 2019193).

As indicated above, surimi products are generally seafood imitations, however, current diet focuses more on carbohydrate-rich products, such as pasta. However, a surimi-based product similar to fresh pasta is not known up until now. In this sense, the inventors of the present invention have developed a surprising product which is in the form of pasta, is rich in fish proteins and has the texture and consistency of fresh pasta. Furthermore, said product can be consumed directly without having to cook it, thus providing a easily digestible, ready-to-eat protein source, the product therefore being able to be consumed in a quick and simple manner.

OBJECT OF THE INVENTION

In a first aspect, the present invention relates to a surimi food product similar to fresh pasta, comprising:

surimi, salt, a thickening agent and/or a gelling agent, where the total protein content is at least 8% ($w/w_t$), the maximum total carbohydrate content is 10% ($w/w_t$) and moisture is at least 63% ($w/w_t$).

Likewise, in a second aspect it relates to the method of manufacturing the food product according to the first aspect of the invention, comprising the following steps:

a) chopping surimi at a temperature less than −10° C., b) mixing the chopped surimi with salt, a thickening agent and/or a gelling agent, and water; and homogenizing at a temperature comprised between 0 and 15° C. until obtaining a mass, c) extruding or molding the mass obtained in step b), d) performing heat treatment on the product obtained in step c) in a first steam oven at a temperature comprised between 60 and 98° C., e) cutting the product obtained in step d), f) performing heat treatment on the product obtained in step e) in a second steam oven at a temperature greater than 80° C., and g) cooling the product obtained in step f) to a temperature comprised between 30 and 50° C.

DETAILED DESCRIPTION OF THE INVENTION

In a first aspect, the present invention relates to a surimi food product similar to fresh pasta (referred to hereinafter as product of the invention), comprising;

surimi, salt, a thickening agent and/or a gelling agent, where the total protein content is at 8% ($w/w_t$) the maximum total carbohydrate content is 10% ($w/w_t$) and moisture is at least 63% ($w/w_t$).

The product of the present invention therefore has a nutritional composition characterized by comprising carbohydrates and proteins, the total protein content being at least 8% ($w/w_t$) of protein and the maximum total carbohydrate content being 10% ($w/w_t$).

In the context of the present invention, the percentages are given by weight with respect to total product weight ($w/w_t$), unless otherwise indicated.

In a particular embodiment, the food product of the present invention comprises surimi, salt, a thickening agent and/or a gelling agent; and the total protein content is between 8 and 14% ($w/w_t$), the total carbohydrate content is between 3 and 10% ($w/w_t$) and moisture is between 63 and 75% ($w/w_t$). As is known by the person skilled in the art, carbohydrates, also known as glycosides or saccharides, are biomolecules formed by carbon, hydrogen and oxygen, and proteins are molecules formed by linear amino acid chains.

In the context of the present invention, the term surimi refers to fish muscle that is chopped, washed and drained to a proportion of water similar to the original, with added protein cryoprotectants and generally preserved in frozen state. The raw material (surimi) is obtained acquired from sustainable Fish species. There are different classes of surimi with different gel-forming characteristics, according to their species, the freshness of the fish and the preparation and freezing conditions; therefore, the composition of the product of the invention will vary both in the ingredients and in the percentages thereof. Therefore, if the surimi used is first (Grade SA) or second grade (Grade 1) surimi, for example, it will contain less starch than if it is third grade (Grade C) surimi, and if the gel is too dense, it will have more water as such or as a salt solution.

The product of the invention is a product in which the main ingredient is a fish product and is therefore very healthy but sensorially similar to fresh pasta. In the context of the present invention, the expression "similar to fresh pasta" refers to the product having the form, elasticity, texture, consistency, aroma and flavor typical of fresh pasta, these terms being widely known by the person skilled in the art. Therefore, the product of the invention similar to fresh pasta is a food that is well accepted by consumers, particularly by children, and very healthy due to its high fish protein content.

In the context of the present invention, the terms thickening agent and gelling agent have the ordinary meaning for the person skilled in the art. Therefore, thickening agent refers to a substance which, when added to a mixture, increases mixture viscosity without substantially modifying other properties of the mixture such as flavor, and gelling agent refers to a substance which, when added to a mixture, forms a gel without substantially modifying other properties of the mixture such as flavor.

The thickening and/or gelling agents provide stability and improve end product elasticity and texture characteristics which, in combination with surimi, allow obtaining a texture with characteristics similar to that of fresh pasta. Therefore, in a particular embodiment according to any one of the embodiments described in the preceding paragraphs, the thickening agent is selected from the group consisting of starch, flour, fecula and a mixture thereof. In another particular embodiment according to the preceding embodiments, the gelling agent is selected from the group consisting of plant protein, animal protein and mixtures thereof, and more particularly from the group consisting of milk protein, plant protein, egg albumin and mixtures thereof. In another particular embodiment according to the preceding embodiments, the thickening agent is selected from the group consisting of starch, flour, fecula and a mixture thereof, and the gelling agent is selected from the group consisting of milk protein, plant protein, egg albumin and mixtures thereof. In a particular embodiment, the product of the invention according to any one of the preceding particular embodiments comprises 4-10% ($w/w_t$) of a thickening agent; in another particular embodiment, it comprises 2-8% ($w/w_t$) of a gelling agent; and in another particular embodiment, it comprises 4-10% ($w/w_t$) of a thickening agent and 2-8% ($w/w_t$) of a galling agent.

Salt, particularly sodium chloride or potassium chloride and preferably sodium chloride, assures solubilization of fish muscle myofibrillar proteins responsible for gelling. Therefore, in a particular embodiment the product of the invention according to the preceding paragraphs comprises between 1-3% ($w/w_t$) of salt, particularly KCl or NaCl and preferably NaCl, thus obtaining a gel having a density similar to fresh pasta.

In a particular embodiment according to any one of the preceding particular embodiments, the product of the invention comprises between 35% and 45% ($w/w_t$) of surimi. In a more particular embodiment, the product of the invention according to any one of the preceding embodiments comprises 35-45% ($w/w_t$) of surimi and 1-3% ($w/w_t$) by weight of salt. In a more particular embodiment of the first aspect of the invention, the product of the invention composes 35-45% ($w/w_t$) of surimi, 1-3% ($w/w_t$) by weight of salt, and 4-10% ($w/w_t$) of a thickening agent and/or 2-8% ($w/w_t$) of a gelling agent, the conditions of elasticity, texture and consistency typical of fresh pasta thus being achieved.

To improve the rheological characteristics of the product of the invention, other ingredients having a texture- and flavor-modifying function can be added. Therefore, in a particular embodiment of the invention the food product of the invention according to any of the preceding paragraphs further comprises an additional ingredient selected from the group consisting of dietary fiber, vegetable oil, a flavor enhancer and mixtures thereof.

In a particular embodiment of the product of the invention according to any one of the particular embodiments described in the preceding paragraphs, the product of the invention has 3-12% ($w/w_t$) of vegetable oil. This oil content allows obtaining a white product similar to cooked pasta; in fact, the higher the oil content within this range, the whiter the product. In a particular embodiment, the vegetable oil is selected from sunflower oil, soybean oil, rapeseed oil, olive oil and mixtures thereof. In a preferred embodiment, the vegetable oil is sunflower oil, chosen sensory-wise for its mild flavor and nutrition-wise for its high oleic and linoleic acid content. In a particular embodiment, the food product according to the first aspect of the invention described in the preceding paragraphs comprises 35-45% ($w/w_t$) of surimi, 1-3% ($w/w_t$) of salt, 4-10% ($w/w_t$) of a thickening agent and/or 2-8% ($w/w_t$) of a gelling agent, and 3-12% ($w/w_t$) of vegetable oil.

Flavor enhancers are widely known by the person skilled in the art. As is known in the food sector, flavor enhancers, as their name indicates, bring out the flavor in foods. Generally, flavor enhancers are compounds derived from amino acids and nucleotides contributing to develop the $5^{th}$ taste known as umami. In a particular embodiment, the food product of the invention according to any one of the embodiments described in the preceding paragraphs comprises between 0.2 and 1% ($w/w_t$) of flavor enhancers. In a particular embodiment, the food product according to the first aspect of the invention described in the preceding paragraphs comprises 35-45% ($w/w_t$) of surimi, 1-3% ($w/w_t$) of salt, 4-10% ($w/w_t$) of a thickening agent and/or 2-8% ($w/w_t$) of a gelling agent, 3-12% ($w/w_t$) of vegetable oil, and 0.2-1% ($w/w_t$) of flavor enhancer. In another particular embodiment, the flavor enhancer is selected from the group consisting of monosodium glutamate, inosinate, guanylate, yeast extract, hydrolyzed proteins and mixtures thereof. In a preferred embodiment, the flavor enhancer is monosodium glutamate.

The addition of dietary fiber facilitates obtaining the gel state typical of fresh pasta. Likewise, supplying, a larger amount of dietary fiber contributes to the elimination of toxic substances from the body, contributing to integral purification; furthermore, there are many studies that show the beneficial effects of fibers on health, such as in colon cancer prevention, for example. Therefore, in a particular embodiment of the first aspect of the invention the food product according to the preceding paragraphs further comprises dietary fiber, particularly plant dietary fiber. In another particular embodiment, the dietary fiber is selected, from the group consisting of soluble plant fiber, non-soluble plant fiber and mixtures thereof. In a particular embodiment, the dietary fiber is from different sources such as cereals, tubers, legumes and celluloses. In another particular embodiment of the product according to the first aspect of the invention, according to any one of the particular embodiments described in the preceding paragraphs, the fiber content in the product of the invention is 1-2% ($w/w_t$), a percentage with which the gel state typical of fresh pasta is more readily achieved.

In a more particular embodiment, the food product of the invention according to any one of the embodiments of the first aspect of the invention comprises 35-45% ($w/w_t$) of surimi, 1-3% ($w/w_t$) of salt, 4-10% ($w/w_t$) of a thickening agent and/or 2-8% ($w/w_t$) of a gelling agent, 3-12% ($w/w_t$) of vegetable oil, 0.2-1% ($w/w_t$) of flavor enhancer and 1-2% ($w/w_t$) of dietary fiber. With these percentages, the product of the invention is similar to fresh pasta both at the level of texture, elasticity and consistency and at the level of aroma, flavor and color.

Finally, in a particular embodiment the product of the invention according to the preceding paragraphs can be in the form of spaghetti, noodles, vermicelli, pappardelle, fettuccine, linguine, capellini, ziti, bucatini, fusilli, macaroni, rigatoni, tortiglioni, penne, rotini, farfalle, ditalini, semini. These terms are widely known by the person skilled in the art.

The food product of the invention is preferably in the form of spaghetti. In another particular embodiment, the product has a length of 15 to 25 cm, preferably 18-20 cm. In a preferred embodiment, the product is in the form of a cylinder having a diameter of about 1 to 4 mm and a length of 15 to 25 cm, preferably 18 to 20 cm, resulting in a product similar to fresh pasta in the form of spaghetti.

As previously indicated, surimi products are generally seafood imitations; however, current diet focuses more on carbohydrate-rich products, such as conventional pasta. As indicated above, the product of the present invention provides, in the form of fresh pasta, a maximum carbohydrate content of 10% ($w/w_t$), which is much less than that of conventional pasta, and at least 8% of protein, making the product of the present invention a product with an ideal nutritional value for protein-rich low-carb diets.

On the other hand, the current pace of life leaves lithe time for cooking so an important industry involving prepared products for direct consumption, known as ready-to-eat products, is gaining momentum. Surprisingly, the product of the present invention is a ready-to-eat product and therefore does not require cooking for consumption. The product of the present invention is therefore a product in the form of pasta which is rich in fish proteins, has the texture of fresh pasta and a carbohydrate content less than or equal to 10%, which can be consumed directly or even heated or cooked, thus providing an easy-to-consume fish protein source.

In a second aspect, the present invention relates to a method for preparing a food product according to the first aspect of the invention described in the preceding paragraphs (referred to hereinafter as method of the invention), comprising the following steps:

a) chopping surimi at a temperature less than −10° C., b) mixing chopped surimi with salt, a thickening agent and/or a gelling agent, and water; and homogenizing at a temperature comprised between 0 and 15° C. until obtaining a mass, c) extruding or molding the mass obtained in step b), d) performing heat treatment on the product obtained in step c) in a first steam oven at a temperature comprised between 60 and 98° C., e) cutting the product obtained in step d), f) performing heat treatment on the product obtained in step e) in a second steam oven at a temperature greater than 80° C., and g) cooling the product obtained in step f) to a temperature comprised between 30 and 50° C.

The method of the invention starts with receiving in the factory frozen surimi blocks that are not tempered despite being frozen and introducing them directly in the chopping machine. In a particular embodiment, the frozen surimi is chopped at a temperature comprised between −20° C. and −10° C.

In a particular embodiment of the method of the invention, in step b) the chopped surimi is mixed with salt, a thickening agent or a gelling agent, water, and an additional ingredient selected from the group consisting of dietary fiber, vegetable oil, flavor enhancer and mixtures thereof. In another particular embodiment, in step b) the chopped surimi is mixed with salt, a thickening agent and a gelling agent, water, and an additional ingredient selected from the group consisting of dietary fiber, vegetable oil, flavor enhancer and mixtures thereof.

In a particular embodiment of the method of the invention, in step b) the chopped surimi is mixed with salt, a thickening agent and/or a gelling agent, water, and vegetable oil. In another particular embodiment, in step b) the chopped surimi is mixed with salt, a thickening agent and/or a gelling agent, water, vegetable oil, and a flavor enhancer. In another particular embodiment, in step b) the chopped surimi is mixed with salt, a thickening agent and/or a gelling agent, water, vegetable oil, and dietary fiber. In another particular embodiment, in step b) the chopped surimi is mixed with salt, a thickening agent and/or a gelling agent, water, vegetable oil, dietary fiber and a flavor enhancer. More particularly, in any of the particular embodiments of the method of the invention described previously the thickening agent is selected from the group consisting of starch, flour, fecula and a mixture thereof and the gelling agent is selected from the group consisting of animal protein, plant protein and mixtures thereof, and more preferably milk protein, plant protein, egg albumin and mixtures thereof.

In a particular embodiment of the second aspect of the invention according to any of the preceding paragraphs, in step b) of the method 35-45% by weight of surimi with respect to the total mixture obtained in step b) (the percentage by weight with respect to the total mixture obtained in step b) referred to hereinafter as $w/w_m$) is mixed with 1-3% ($w/w_m$) of salt, 4-10% ($w/w_m$) of a thickening agent and/or 2-8% ($w/w_m$) of a gelling agent, and water until the mixture has 25-40% ($w/w_m$) of water. In another particular embodiment, in step b) of the method 35-45% ($w/w_m$) of surimi is mixed with 1-3% ($w/w_m$) of salt, 4-10% ($w/w_m$) of a thickening agent and/or 2-8% ($w/w_m$) of a gelling agent, water until the mixture has 25-40% ($w/w_m$) of water, and an additional ingredient selected from the group consisting of 3-12% ($w/w_m$) of vegetable oil, 1-2% ($w/w_m$) of dietary fiber, 0.2-1% ($w/w_m$) of flavor enhancer and mixtures thereof. In another more particular embodiment in step b) 35-45% ($w/w_m$) of surimi is mixed with 1-3% ($w/w_m$) of salt, 4-10% ($w/w_m$) of a thickening agent and/or 2-8% ($w/w_m$) of a gelling agent, water until the mixture has 25-40% ($w/w_m$) of water, 3-12% ($w/w_m$) of vegetable oil, 1-2% ($w/w_m$) of dietary fiber and 0.2-1% (w/w) of flavor enhancer.

As indicated above, one of the objectives of the present invention is to provide a product rich in fish proteins similar to fresh pasta. To obtain the characteristic form and dimensions of fresh pasta, the mass obtained in step b) can be extruded or molded depending on the form of the end product to be obtained. Therefore, if a product similar to fresh pasta in the form of spaghetti is to be produced, it is advisable to use an extrusion machine for that purpose coupled to a continuous line allowing subsequent heat treatment. Therefore, in a particular embodiment in step c) the product is extruded in the form of a cylinder.

In the steps of heat treatment, i.e., steps d) and f), the degree of product gelling is controlled by methods known by the person skilled in the art, particularly by means of performing rheological analyses with a texture meter. In a particular embodiment, the product is extruded and then moves to a first steam oven (step d)) where it remains as long as necessary to achieve a sufficient degree of gelling which allows cutting it at the outlet of the oven. The temperature of the oven is between 60-98° C. depending on the speed of the production process. Time and temperature are variables to be contemplated according to production process and capacity. In a preferred embodiment, step d) is carried out at a temperature comprised between 75 and 98° C. In another preferred embodiment, step d) is carried out for between 2 and 10 seconds. In a more preferred embodiment, step d) is carried out at a temperature comprised between 70 and 90° C. for between 2 and 10 seconds.

The product then moves to the cutting station. In a particular embodiment, in step e) the product is cut with a length of 15 to 25 cm, preferably 18-20 cm. In a preferred embodiment, in step c) the product is extruded in the form of a cylinder of about 1 to 4 mm and in step e) the product is cut with a length of 18 to 20 cm.

The cut product is then subjected to a second heat treatment (step f)). The cut product moves to a second steam oven where the gelling process is completed. To that end, the product remains in the mentioned oven long enough so that at the outlet of the oven, said product is at a temperature greater than 80° C., which is the optimal gelling temperature of myofibrillar proteins. Therefore, in a particular embodiment according to any one of the embodiments described above step f) is carried out at a temperature greater than 80° C., and preferably at a temperature comprised between 85 and 97° C. In another particular embodiment, step f) is carried out for between 30 seconds and 3 minutes. In a more preferred embodiment, step f) is carried out at a temperature comprised between 85 and 97° C. and for between 30 seconds and 3 minutes.

In a preferred embodiment, step d) is carried out for between 2 and 10 seconds at a temperature comprised between 70 and 90° C. and step f) is carried out for between 30 seconds and 3 minutes at a temperature comprised between 85 and 97° C. The combination of these conditions and ingredients of the product of the invention provide a texture, consistency and elasticity similar to that of fresh pasta.

Step g) of cooling (setting step) is of essential importance since it allows stabilizing the product of the invention. Therefore, in another particular embodiment in step g) of the method according to any one of the preceding embodiments the product obtained in step f) is cooled to a temperature comprised between 30 and 40° C.

Finally, in another particular embodiment the method of the invention comprises a metering, weighing, packaging and pasteurizing step after step g). As indicated above, a significant advantage of the product of the invention is that it is a product suitable for direct consumption, i.e., a ready-to-eat product, so metering can be carried out such that the end product is metered into containers with a different number of portions, for example, one, two or three portions for direct consumption.

In a third and final aspect, the present invention relates to a surimi food product similar to fresh pasta according to any one of the embodiments described in the first aspect of the invention obtainable by the method of the invention according to any one of the embodiments of the second aspect of the invention described in the preceding paragraphs.

EXAMPLES

Specific embodiments of the invention aiding to illustrate the invention are described in detail below.

Example 1

The food product of the invention was prepared following a method comprising the following steps:

a) chopping surimi or cutting it into pieces at a temperature less than −10° C., b) mixing chopped or cut surimi with the other ingredients indicated below, and homogenizing at a temperature of 2° C. until obtaining a mass, c) extruding or molding the mass obtained in step b), d) performing heat treatment on the product obtained in step c) in a first steam oven at a temperature of 85° C. for 5 seconds.

e) cutting the product obtained in step d), f) performing heat treatment on the product obtained in step e) in a second steam oven at a temperature of 95° C. for 3 minutes, and g) cooling the product obtained in step f) to a temperature of 35° C.

The following ingredients are mixed in step b):

| | |
|---|---|
| Surimi | 36% |
| Water | 36% |
| Flour | 6.7% |
| Plant protein | 4% |
| Milk protein | 4% |
| Sunflower oil | 10% |
| Monosodium glutamate | 0.2% |
| Salt | 1.5% |
| Fiber | 1% |
| Flavorings | 0.6% |

The end product therefore has lightness characteristics (L value) and color characteristics (a value, b value) according to the Lab Scale of:

L value=73 a value=−1.61 b value=11.86 where, as is known by the person skilled in the art, the L value has values comprised between 0-100, where L=0 indicates black and L=100 indicates white), the a value shows the color between red and green (negative values indicate green while positive values indicate red), and the b value indicates color between yellow and blue (negative values indicate blue and positive values indicate yellow).

The end product also has the following rheological characteristics:

Breaking strength (force to be applied for breaking same)=288 g

Deformation strength (capacity to stretch without breaking)=0.87 cm

Gel strength=250.56 g×cm.

The nutritional analysis of 100 grams of product is indicated in the following table (Table 1):

| Energy value (kJ/kcal) | 704/169 |
|---|---|
| Fats (g) | 10 |
| of which: | |
| saturated fats (g) | 1.2 |
| monounsaturated fats (g) | 4.7 |
| polyunsaturated fats (g) | 4.1 |
| Carbohydrates (g) | 6.2 |
| of which | |
| sugars (g) | 1.3 |
| Dietary Fiber (g) | 1.0 |
| Proteins (g) | 13 |
| Salt (g) | 1.5 |

Example 2

The method described in Example 1 was followed but by mixing the following ingredients in step b);

| | |
|---|---|
| Surimi | 45% |
| Water | 40% |
| Starch + fecula | 4% |
| Egg albumin | 3.7% |
| Sunflower oil | 5% |
| Monosodium glutamate | 0.2% |
| Salt | 1.5% |
| Flavorings | 0.6% |

The end product therefore has lightness characteristics (L value) and color characteristics (a value, b value) according to the Lab Scale of:

L value=85.44 a value=−2.86 b value=7.72

The end product also has the following rheological characteristics:

Breaking strength (force to be applied for breaking same)=225.35 g

Deformation strength (capacity to stretch without breaking)=1.018 cm

Gel strength=229.40 g×cm.

The nutritional analysis of 100 grams of product is indicated in the following table (Table 2):

| Energy value (kJ/kcal) | 450/107 |
|---|---|
| Fats (g) | 5 |
| of which: | |
| saturated fats (g) | 0.6 |
| monounsaturated fats (g) | 2.4 |
| polyunsaturated fats (g) | 2.1 |
| Carbohydrates (g) | 4.6 |
| of which: | |
| sugars (g) | 1.4 |
| Dietary Fiber (g) | 0 |
| Proteins (g) | 11 |
| Salt (g) | 1.5 |

The invention claimed is:

1. A pasta-like food product comprising:
surimi,
salt,
4-10% ($w/w_t$) of a thickening agent selected from the group consisting of starch, flour, fecula, and a mixture thereof, and
3-12% ($w/w_t$) of vegetable oil, and
wherein the total protein content is between 8% and 14% ($w/w_t$), the total carbohydrate content is between 3% and 10% ($w/w_t$) and moisture is between 63 and 75% ($w/w_t$), and wherein the food product is a fresh pasta-like and ready-to-eat product.

2. The food product of claim 1, wherein the food product further comprises a gelling agent.

3. The food product of claim 2, wherein the gelling agent is selected from the group consisting of plant protein, animal protein and mixtures thereof.

4. The food product of claim 1, comprising 35-45% ($w/w_t$) of surimi.

5. The food product of claim 1, comprising 1-3% ($w/w_t$) of salt.

6. The food product of claim 2, comprising 2-8% ($w/w_t$) of a gelling agent.

7. The food product of claim 1, further comprising an ingredient selected from the group consisting of dietary fiber, a flavor enhancer, and mixtures thereof.

8. The food product of claim 7, comprising 0.2-1% ($w/w_t$) of flavor enhancer.

9. The food product of claim 7, comprising 1-2% ($w/w_t$) of dietary fiber.

10. A method of manufacturing the pasta-like food product of claim 1, comprising the steps of:
a) chopping surimi at a temperature less than −10° C.,
b) mixing the chopped surimi with salt, a thickening agent selected from the group consisting of starch, flour, fecula, and a mixture thereof, a vegetable oil, and water; and homogenizing at a temperature comprised between 0 and 15° C. until obtaining a mass,
c) extruding or molding the mass obtained in step b),
d) performing heat treatment on the product obtained in step c) in a first steam oven at a temperature comprised between 60 and 98° C.,
e) cutting the product obtained in step d)
f) performing heat treatment on the product obtained in step e) in a second steam oven at a temperature greater than 80° C., and
g) cooling the product obtained in step f) to a temperature comprised between 30° C. and 50° C.,
wherein said method provides a fresh pasta-like and ready-to-eat food product.

11. The method of claim 10, wherein step b) further comprises mixing the chopped surimi, salt, thickening agent, vegetable oil, and water with one or more dietary fiber, and flavor enhancers prior to homogenization to obtain a mass.

12. The method of claim 10, further comprising the steps of metering, weighing, packaging and pasteurizing the product after step g).

13. The method of claim 10, wherein step b) the chopped surimi is mixed with a salt, a thickening agent, a vegetable oil, a gelling agent and water.

14. The method of claim 13, wherein step b) further comprises mixing the chopped surimi, salt, thickening agent, vegetable oil, gelling agent, and water with one or more dietary fiber, and flavor enhancers prior to homogenization to obtain a mass.

15. The method of claim 13 further comprising the steps of metering, weighing, packaging and pasteurizing the product after step g).

16. The food product of claim 1, wherein the vegetable oil is selected from the group consisting of sunflower oil, soybean oil, rapeseed oil, olive oil, and mixtures thereof.

17. The food product of claim 1, wherein the product is in the form of spaghetti.

* * * * *